R. E. SCHWARZ.
MACHINE FOR MOLDING ARTIFICIAL STONE.
APPLICATION FILED OCT. 25, 1917.
1,253,730.
Patented Jan. 15, 1918.
3 SHEETS—SHEET 3.
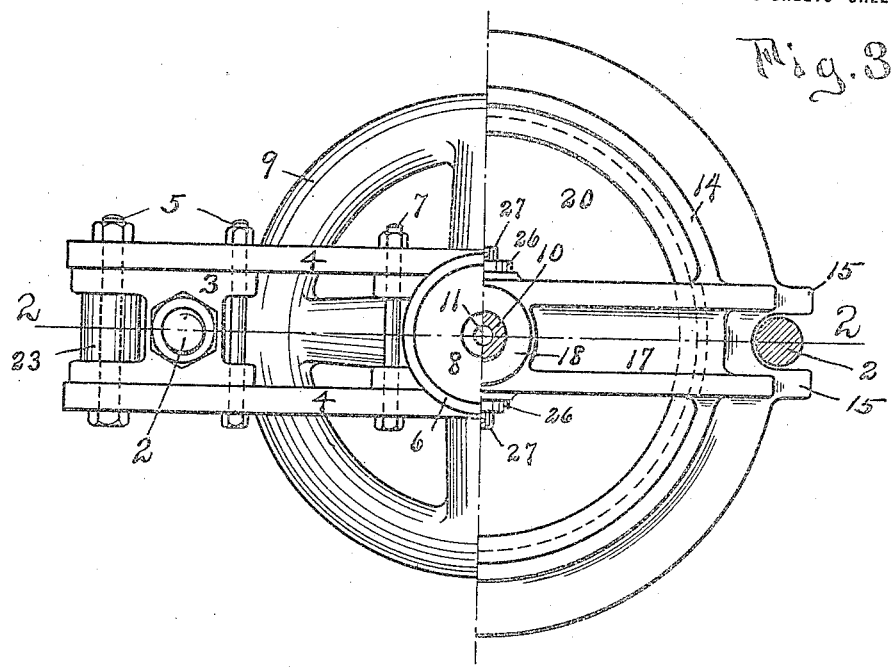
Fig. 3.
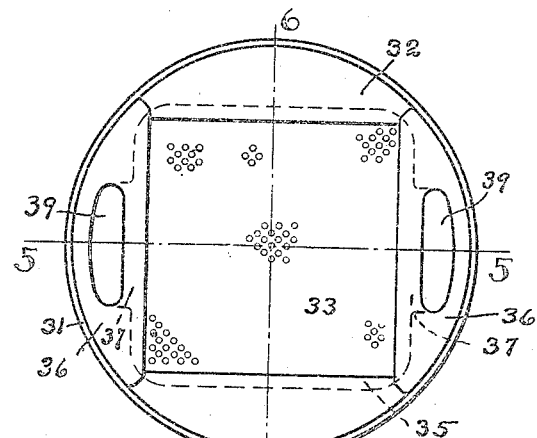
Fig. 4.
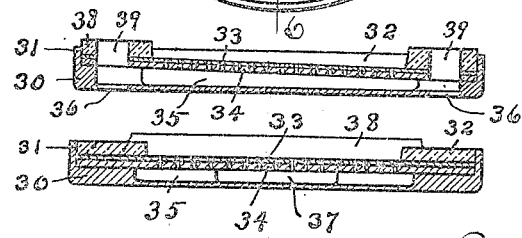
Fig. 5.
Fig. 6.
Richard E. Schwarz.

ured by means of the bolts 5. A bearing 6
UNITED STATES PATENT OFFICE.

RICHARD E. SCHWARZ, OF DETROIT, MICHIGAN.

MACHINE FOR MOLDING ARTIFICIAL STONE.

1,253,730. Specification of Letters Patent. Patented Jan. 15, 1918.

Application filed October 25, 1917. Serial No. 198,373.

*To all whom it may concern:*

Be it known that I, RICHARD E. SCHWARZ, a citizen of the United States, and residing at Detroit, in the county of Wayne and State of Michigan, have invented a new and Improved Machine for Molding Artificial Stone, of which the following is a specification.

This invention relates to the manufacture of shingles, tiles and other objects from plastic materials, and its object is to produce a molding machine in which separate quantities of moist or wet plastic material in superimposed molds may be subject to any desired air pressure to force the moisture out through fine perforations in the bottoms of the mold.

This invention consists of a bed and a main frame for receiving and guiding a shell, a piston in the shell, a series of molds for plastic material which, when placed on top of each other, form a drain passage into which the liquid portion of the plastic material may be caused to flow by the difference in the air pressures above and below the plastic material in the molds, and means for forcing the shell down onto the bed and for forcing the piston down onto the molds. It further consists in forming the sides of the molds of rubber or other yieldable material so that the drain passage may be so tight as to prevent any undesired passage of air from the outsides of the molds into said passage and so as to permit the molded plastic material to be easily removed from the mold. It also consists in providing a perforated follower disk between the molds and the piston and a skirting connected to this disk and extending between the molds and the shell, the skirting preventing any of the splashed out plastic material from reaching the inner wall of the shell. It also consists in the details of construction illustrated in the accompanying drawings and particularly pointed out in the claims.

Figure 1:
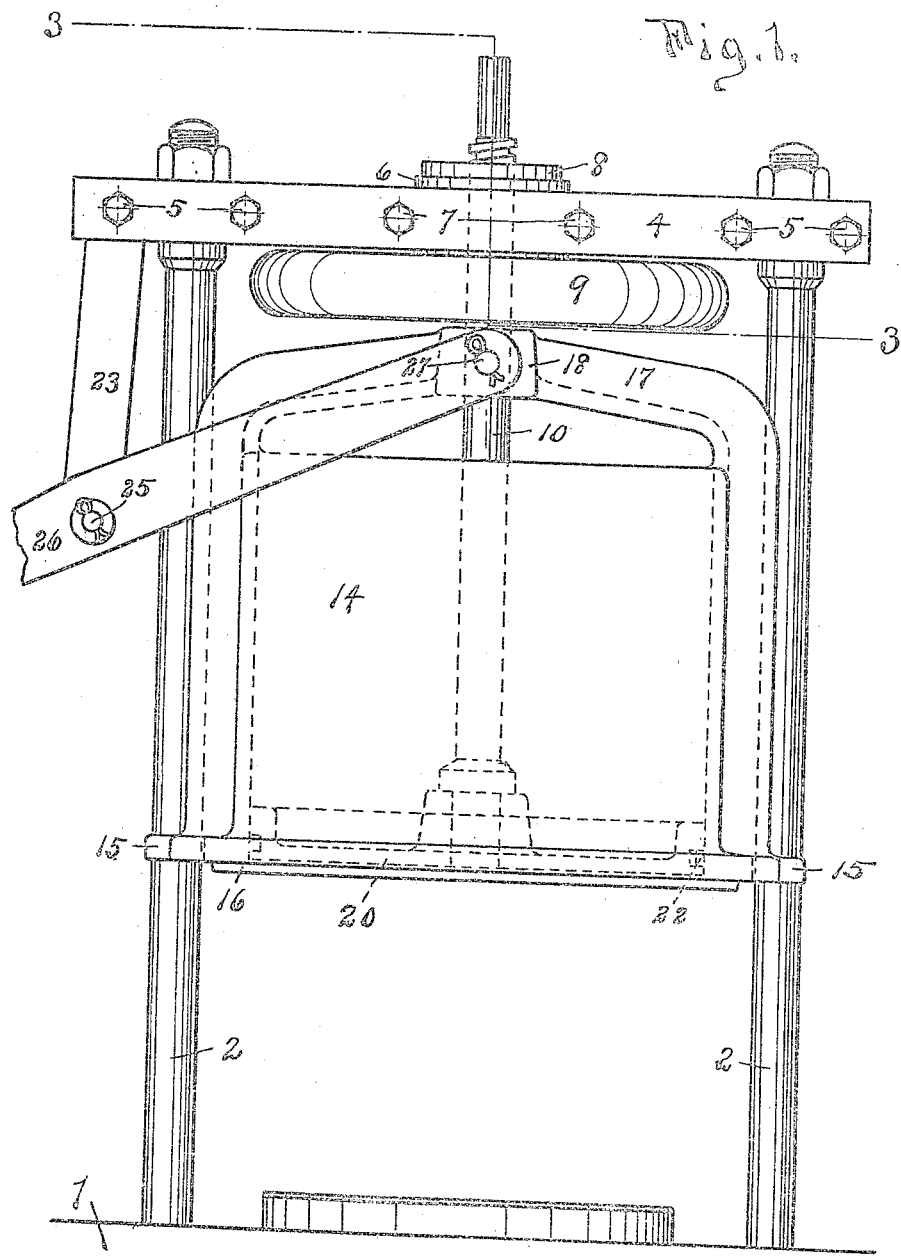
Figure 2:
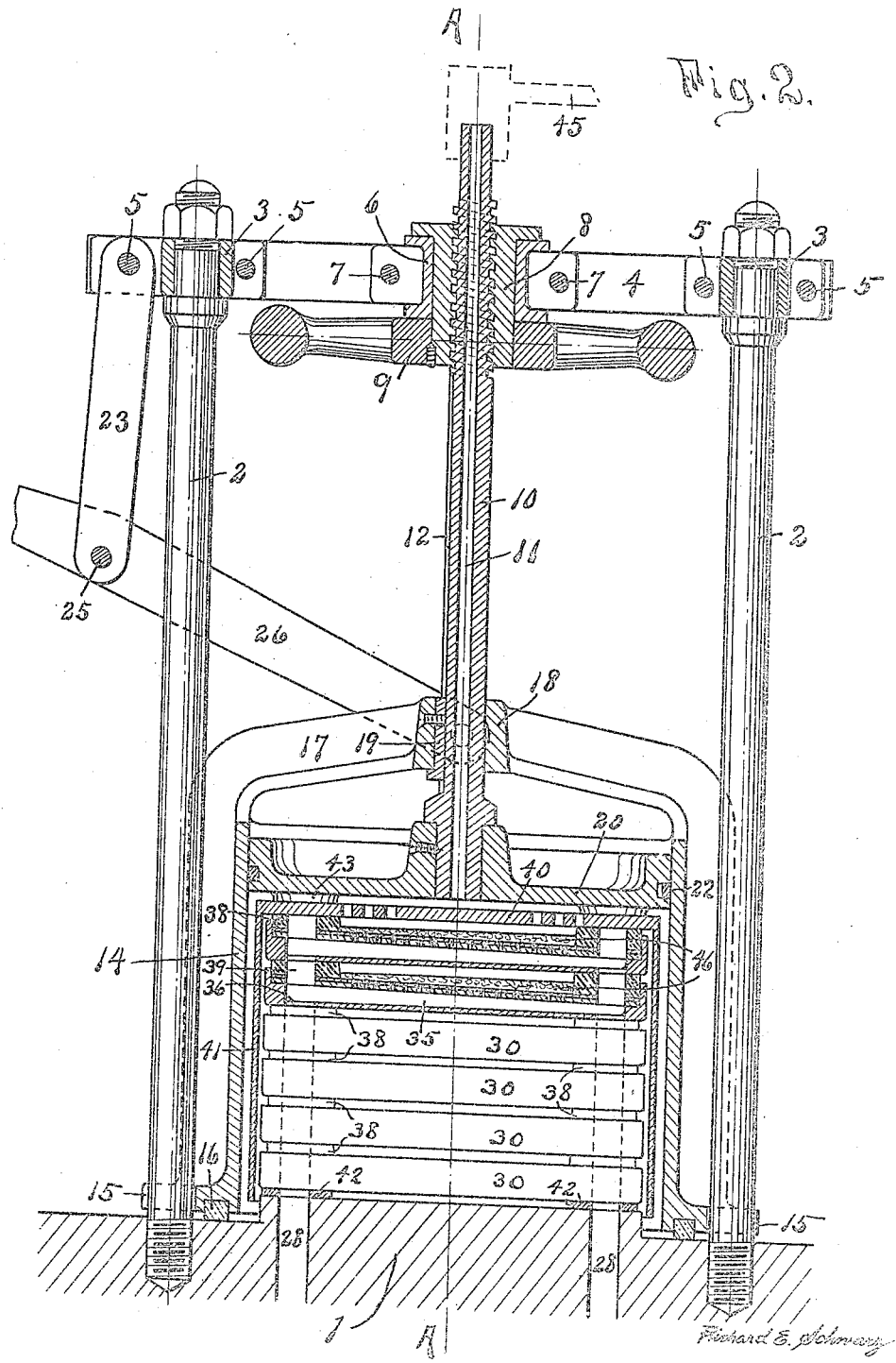

In the drawings, Figure 1 is an elevation of this improved molding machine with the shell and piston elevated and the molds removed. Fig. 2 is a vertical section on the line 2—2 of Fig. 3. Fig. 3 is a section on the line 3—3 of Fig. 1. Fig. 4 is a plan of a mold. Figs. 5 and 6 are sections on the lines 5—5 and 6—6 of Fig. 4, respectively.

Similar reference characters refer to like parts throughout the several views.

The foundation or bed 1 of this device receives the posts 2 which carry the spacing blocks 3 to which the cross bars 4 are secured by means of the bolts 5. A bearing 6 is secured between these cross bars by means of the bolts 7 and receives the nut 8 to which a hand-wheel 9 is secured. A threaded piston stem or rod 10 in this nut has a central passage 11 and a longitudinal groove 12.

Slidable on the posts 2 is a shell 14, preferably cylindrical, having lugs 15 to engage the posts, also having a packing ring 16 at its lower end, and also having a yoke 17 provided with a hub 18 which is slidable on the piston rod 10. A key 19 carried by this hub extends into the groove 12 and prevents the piston rod from turning.

A piston 20 is secured to the lower end of the piston rod and is slidable in the shell 14, a piston ring 22 being provided if desired. A link 23 may be pivoted on one of the bolts 5 at its upper end and carry a bolt 25 at its lower end upon which the double lever 26 may be pivoted. The inner end of this lever connects to the pins 27 carried by the hub 18 of the yoke 17. The shell can therefore be lifted very quickly from the position shown in Fig. 2 to that shown in Fig. 1 to permit the molds to be stacked on the bed, while the piston may be moved short distances up and down by means of the hand-wheel 9. The bed is formed or provided with passages 28 connecting to a suction pump if desired.

The shell 14 is made cylindrical because that is usually the easiest form to finish, but it will be understood that any other cross section may be used so long as the piston can be made to slide therein without leakage. The molds will be of substantially the same general conformation as the shell and in the present case are shown in Figs. 4, 5 and 6 to be circular in character. These molds are formed of a base portion 30 having a cylindrical flange 31 which positions the rubber portion 32, and the two perforated disks 33 and 34. The upper disk 33 is preferably of brass and is formed with many fine perforations, while the lower disk 34 is of steel with fewer and larger perforations. These disks form the top of the air chamber 35 in the base, which chamber connects to the vertical passages 36 in the bottom of the base by means of lateral passages 37. The yieldable upper portion of the mold is formed with elevated portions 38 provided with vertical passages 39 in alinement with the passages 36 in the base. The rectangular space within the rubber portion of the mold is preferably formed with a sloping bottom when shingles are to be formed in the mold and the chamber 35 below the two perforated plates is formed, therefore, with a sloping top under these conditions. Where flat tiles are to be molded the plates 33 and 34 will be horizontal. Extending across the uppermost mold is a perforated disk 40 having a skirting 41 of the same general conformation as the shell and molds.

When the machine is to be used a pair of washers 42 are placed upon the base 1 to surround the passages 28. The molds are filled with the plastic material 46, usually a wet mixture of cement and asbestos fibers, and then these molds are placed on top of each other with the passages 36 and 39 in alinement. The skirting 41 is then lowered down over this stack of molds until the disk 40 rests upon the upper mold, whereupon the stack of molds with the washers 42 below them are placed in the position shown in Fig. 2, that is, central with the central line A—A of the shell 14. The shell 14 is then lowered down upon the bed until the packing ring 16 is compressed sufficiently by the pressure of and on the shell to prevent the escape of air between the lower edge of the shell and the bed. As there is little lift of the air on the shell, this pressure need not be great. The piston 20 is then forced down onto the disk 40, the piston being preferably provided with lugs 43 to concentrate the pressure directly above the passages 28. The plate 40 closes the upper ends of these discharge passages. Air pressure is then applied to the upper surfaces of the plastic material in the molds through the central passage 11 in the piston rod 10, which passage connects to a source of air under pressure by means of a pipe 45.

Under certain conditions it may be desirable to merely exhaust the air below the plates 33 and 34 through the pipes 28 and rely upon the normal air pressure above the plastic material. In such case it is unnecessary to lower the shell 14 down around the molds. But where heavy pressures are to be employed, the shell is forced down to its normal position and held there, and the piston forced down upon the molds so that a leakage of air from within the shell except through the plastic material to the chambers 35 within the molds and then through the passages 28, is absolutely prevented. After the pressure has been applied for a very short time, the plastic material within the molds becomes quite hard and contains very little moisture. The shell is then elevated, the pressure of the piston removed and the molds with the inclosing skirting 31 are slid out off the bed.

Substantially the entire upward pressure of the air within the shell 14 is resisted by the piston so that little force is necessary to hold down the shell. The various parts may be made heavy enough to resist any desired air pressure. The details and proportions of the various parts of this structure may all be changed without departing from the spirit of my invention as set forth in the following claims.

It is apparent that this construction permits the molding under pressure of any desired number of slabs, shingles or tiles simultaneously while the pressure machines of the prior art do not permit the molding of more than one element at one time.

I claim:—

1. In a machine for molding artificial stone, the combination of a series of superimposed molds to receive plastic material and formed with connecting passages, a shell surrounding the molds and spaced therefrom, a piston within the shell, means to force the piston down onto said molds, and means to cause a difference in air pressure in the spaces above and below the plastic materials in the molds.

2. In a machine for molding artificial stone, the combination of a bed and a frame mounted thereon, a shell guided for vertical movement by said frame, a series of superimposed molds to receive plastic material which molds are carried by said bed and surrounded by said shell, a piston slidable within said shell, and means to force said piston down onto said molds within the shell, said molds being provided with drainage passages to receive the excess water in the plastic material and with connecting vertical passages to carry said water from said molds when the pressure of air above the plastic material in the molds is greater than that below said plastic material.

3. In a machine for molding artificial stone from plastic material, the combination of a bed and a frame mounted thereon, a series of superimposed molds for plastic material which are positioned on the bed and each of which comprises a main portion having a chamber to receive the water removed from the plastic material, a perforated plate above the partition and a third part of the mold positioned upon the partition and forming the sides of the mold, said molds being formed with registering vertical passages and with lateral passages connecting said chambers thereto, and means for causing a greater air pressure above than below the plastic material in the molds.

4. A mold for artificial stone comprising a body formed with a central chamber surrounded by a ledge, a perforated plate resting on the ledge, and a member constituting the sides of the mold for the plastic material and resting on the plate, said last named member and the body being formed with registering passages and the body being formed with a lateral passage connecting said chamber to the vertical passage.

5. A mold for forming artificial stone from plastic material comprising a perforated plate and a mold body having a ledge supporting the edges of the plate and having a flange extending up at the edges of the plate, and a pad of resilient material formed with a central recess of the shape to be given to the artificial stone.

6. A mold for forming artificial stone from plastic material comprising a perforated plate and a mold body having a ledge supporting the edges of the plate and having a flange extending up at the edges of the plate, and a pad of resilient material formed with a central recess of the shape to be given to the artificial stone, said pad having diametrically opposed portions of greater thickness provided with transverse passages and said mold body having a chamber below said plate and transverse holes registering with the passages in the pad and connecting to said chamber.

7. In a machine for molding artificial stone, the combination of a series of superimposed molds for plastic material formed with connecting passages, a vertically movable shell surrounding the molds and spaced therefrom, a perforated plate resting upon the upper mold and a skirting extending down between the molds and the shell, a piston slidable within the shell, means to force the piston down onto said perforated plate, and means to cause a difference in air pressure in the spaces above and below the plastic material in the molds.

8. In a machine for molding artificial stone, the combination of a series of superimposed molds to receive plastic material and formed with registering openings which together constitute a vertical passage, each mold comprising a perforated plate upon which the plastic material is supported and with a chamber below the plate connecting to said passages, a perforated plate resting upon the upper mold and closing the upper end of said passage, and means to force the plate down onto said molds, the spaces of the several molds which receive the plastic material being freely open to the space surrounding the molds.

9. In a machine for molding artificial stone, the combination of a series of superimposed molds for plastic material and a support for the molds, each mold comprising a hollow body, a perforated plate extending across the hollow of the body, and a resilient pad constituting the sides of the mold, the top of each mold being open to permit free access of the air surrounding the molds to the plastic material, the air pressure within the molds below the perforated plates being lower than above the plastic material.

RICHARD E. SCHWARZ.

Copies of this patent may be obtained for five cents each, by addressing the "Commissioner of Patents, Washington, D. C."